United States Patent
Gassmann et al.

(10) Patent No.: US 9,297,476 B2
(45) Date of Patent: Mar. 29, 2016

(54) VALVE DRIVE ASSEMBLY AND VALVE USING THE SAME

(71) Applicant: Johnson Electric S.A., Murten (CH)

(72) Inventors: Joerg Gassmann, Dresden (DE); Thomas Mueller, Dresden (DE); Sebastian Fraulob, Dresden (DE)

(73) Assignee: Johnson Electric S.A., Murten (CH)

( * ) Notice: Subject to any disclaimer, the term of this patent is extended or adjusted under 35 U.S.C. 154(b) by 235 days.

(21) Appl. No.: 14/020,485

(22) Filed: Sep. 6, 2013

(65) Prior Publication Data

US 2014/0070125 A1  Mar. 13, 2014

(30) Foreign Application Priority Data

Sep. 7, 2012 (DE) .................. 10 2012 108 379

(51) Int. Cl.
| | |
|---|---|
| *F16K 41/00* | (2006.01) |
| *F16K 31/44* | (2006.01) |
| *F16K 41/04* | (2006.01) |
| *F16K 41/08* | (2006.01) |
| *F16K 5/06* | (2006.01) |

(52) U.S. Cl.
CPC .............. *F16K 31/44* (2013.01); *F16K 41/003* (2013.01); *F16K 41/04* (2013.01); *F16K 41/08* (2013.01); *F16K 5/0694* (2013.01)

(58) Field of Classification Search
CPC ....... F16K 5/0694; F16K 41/02; F16K 41/04; F16K 41/08; F16K 41/003; F16C 33/04
USPC .................. 251/214; 384/129, 130, 275, 276; 277/422
See application file for complete search history.

(56) References Cited

U.S. PATENT DOCUMENTS

| | | | | |
|---|---|---|---|---|
| 2,110,098 | A * | 3/1938 | Strecker | 251/184 |
| 2,225,472 | A * | 12/1940 | Franklin | 277/604 |
| 4,913,562 | A * | 4/1990 | Rosen | 384/276 |
| 6,051,795 | A * | 4/2000 | Fisher et al. | 174/153 G |
| 6,202,984 | B1 * | 3/2001 | Fichtner et al. | 251/335.3 |
| 7,093,618 | B2 * | 8/2006 | Williams | F16K 27/0218 137/876 |
| 2007/0246677 | A1 * | 10/2007 | Bircann | F02M 25/0789 251/214 |
| 2013/0065505 | A1 * | 3/2013 | Yoskowitz | 454/317 |

FOREIGN PATENT DOCUMENTS

| | | |
|---|---|---|
| EP | 1106923 B1 | 6/2006 |
| EP | 1434965 | 7/2007 |
| EP | 1591702 B1 | 7/2007 |

* cited by examiner

*Primary Examiner* — Matthew W Jellett
(74) *Attorney, Agent, or Firm* — Muncy, Geissler, Olds & Lowe, P.C.

(57) ABSTRACT

The invention concerns an valve drive assembly for a valve unit for regulating a flow of fluid with a lead-through of an operating rod (3) through a flange (4), particularly the arrangement of operating rod (3) to the flange (4) for adjusting a defined flow of fluid. The assembly comprises a flange (4), and operating rod (3) and an annular element. The operating rod (3) is disposed through said flange, and annular element is disposed between flange (4) and operating rod (3) defining an annular gap (12) between the annular element and the operating rod. An effective length of the annular gap (12) exceeds a thickness of the flange (4). This invention leads to considerable cost savings, as the component parts can now be produced more simply using manufacturing processes known from mass production, such as deep-drawing or even stamping.

11 Claims, 4 Drawing Sheets

US 9,297,476 B2

VALVE DRIVE ASSEMBLY AND VALVE USING THE SAME

CROSS REFERENCE TO RELATED APPLICATION(S)

This application claims the benefit of German Patent Application Serial No. 102012108379.7 having a filing date of Sep. 7, 2012. The entire content of the aforementioned is hereby incorporated by reference for all purposes.

FIELD OF THE INVENTION

The invention relates to an actuator for a valve unit to regulate a flow of fluid from a modulation valve.

BACKGROUND OF THE INVENTION

In principle, a valve unit for regulating a flow of fluid comprises a valve body which restricts and controls fluid flows through its inside by means of a modulation-sealing system. Thus the fluid flows into an inlet opening of one side of the valve body and flows out through an outlet opening on the opposite side. To operate such a valve body, an actuator is connected upon an interposed flange, producing an intermediate chamber facing the valve between the actuator and the valve body. By means of a lead-through in the flange, the valve is operated by an operating rod of the actuator. The situation of the valve selectively depends on the position of the operating rod, to ensure the valve closes, completely opens or a certain flow is modulated by a rotational or linear movement of the operating rod. In the normal operating condition, no fluid reaches this intermediate chamber facing the valve. However, in the event of a fault, for example, if a sealing diaphragm is damaged (tear in the diaphragm), this intermediate chamber facing the valve fills with the fluid and the operating pressure of the fluid retained in said chamber.

By means of the annular gap between the operating rod and the flange plate, the flow of the fluid is reliably and permanently restricted to a defined permitted maximum for safety reasons. This is achieved by designing the lead-through of the operating rod through the flange with as narrow as possible an interference fit between the operating rod and the flanged plate. The maximum possible flow of the fluid through the annular gap may be adjusted by means of this narrow gap interference fit of the annular gap. The size of the gap thus produced is therefore to be selected very small, so that narrow interference fits between the flange plate and the operating rod are required. Such interference fits are cost-intensive, as they have the condition of a high expense both in the mechanical production of the component parts and in the assembly of the operating rod and the flange.

In DE 60028508T2, a valve unit for controlling a combustible gas is described, which entails increasing the safety against a possible interruption of electrical supply to the electromagnetic drive of an actuator. Therefore, this valve unit is constructed in such a way that two actuators are used for safety reasons. For certain individual cases, such valve systems with two actuators are absolutely necessary. Nevertheless, this raises the problem that at the lead-through points of the operating rods, the narrow interference fit between both of the actuators must be designed twice. This solution is therefore quite expensive and cost-intensive to manufacture. In DE 60028508 there are no lead-throughs. In this case, the actuators themselves are sealed.

Furthermore, in DE 602005001650T2, a housing arrangement of a valve unit is described, which represents a considerable simplification of the other so-called double valve units, where instead of a double valve unit as described previously, a valve body is demanded where only a single valve flap is used. That has the advantage that, as well as the simpler and cheaper construction of this valve unit, considerably less expense is needed in maintenance, which further reduces the cost. In this solution it is also described how the operating rod is lead through a flange and how the seal is provided here by means of a bushing. This proposes that an internal bushing is to be interposed between the flange and the operating rod. However, it is recommended that the bushing is preferably omitted and as there must be a narrow interference fit here, the selection of materials for the cylinder and the operating rod that exhibit a lower degree of friction are recommended, so that no lubricant is required between the flange and the operating rod. In DE 602005001650 the aim is to achieve a light construction of a valve unit and simple maintenance and to realise a lead-through of an operating rod through a flange with the best possible sliding properties—with or without a friction bearing bushing. The arrangement is solely a single bearing position and the length serves solely the bearing or a bearing must exhibit a certain minimum length.

Another technical solution to solve the problems of interruption of electrical supply is described in DE 60221032T2. An additional pre-loaded spring unit is provided here, which as a result of its resilience keeps the closing element inside the valve unit closed. When the valve is opened by means of an arranged direct current motor, in other words, when operating the actuator, a spring unit is further pre-loaded. After the electrical supply is shut down or with an unplanned interruption of electrical supply, the valve flap inside is closed again by the restoring forces of the spring unit. In the same way, a bushing is arranged here between the flange and the operating rod of the actuator where there is the problem of the narrow interference fit between these two component parts here as well. In this case, too, the bushing serves solely to guide the operating rod.

SUMMARY OF THE INVENTION

In general, the following technical solutions applies to all literature listed above.

The task of the invention is to improve an actuator for a valve drive assembly to regulate a flow of fluid, so that both the manufacture of the accessory parts and the fitting of the valve with the actuator is designed more cheaply, where the greater tolerances in manufacture shall be enabled and particularly the actuation unit of the valve is simplified. The required flow restriction can overall be implemented more stably, securely and precisely.

A valve drive assembly for a valve is sealed by means of diaphragms disposed in the valve body, comprising a valve body 2 and with a lead-through of an operating rod 3 through a flange 4. Particularly the arrangement of the operating rod 3 to the flange 4 for adjusting a defined flow of fluid.

A valve unit is to regulate a flow of fluid from a modulation valve, where the valve chamber of the actuator is sealed by means of diaphragms disposed on valve body 2 and the valve is operated with operating rod 3. Flange 4 is erected on valve body 2, and formed of a lead-through for an operating rod 3. An actuator 1 is fastened to flange 4 as an operating element by means of a flange-type actuator base 13 and drives operating rod 3. Between flange 4 and operating rod 3 a further annular element, (also known as additional component part or additional material) is arranged, in accordance with the invention. Annular element can be an additional bushing 8 and/or another sleeve 9 or the flange 4 with an additional flange collar 10, or a separate sealing compound 11, or a particular welding material 16 that are arranged between the flange 4 and the operating rod 3. In this case, the effective length L of the annular gap 12 between the operating rod 3 and the annular element exceeds the material thickness H of the flange 4. Surprisingly, it has been found that if the length L of the annular gap 12 exceeds the thickness of the flange 4, the volume flow rate Q is further reduced. In another word, over this length L the volume flow rate Q can be precisely restricted and adjusted through the following mathematical relationship. That means a small change in the gap dimension h actually is able to have a great effect on the volume flow rate Q. The volume flow rate Q through the annular gap 12 is also highly dependent on the length L of the gap Q~1/L, as well as the gap dimension of the annular gap h with the relationship Q~$h^3$. By dimensioning the individual parts accordingly, the narrow lead-through provided with an interference fit between flange 4 and the operating rod 3 in prior art can then be replaced by using a annular element. As well as making savings in the manufacture of a necessary, highly-precise lead-through of the operating rod 3 comprises the interference fits, this also has considerable advantages in fitting the component parts. In other words, the production can be done faster than before with simpler devices. Because the component parts can be provided with larger interference fits, the relevant component parts to be fitted to each other, i.e., the flange 4, the annular element and the operating rod 3 can be produced using manufacturing processes that are simpler and considerably cheaper with larger dimensional tolerances, such as deep-drawing or stamping, for example, in the mass production presented here.

In the novel actuator 1 for a valve unit to regulate a flow of fluid from a modulation valve, which is sealed by means of diaphragms up to the valve body 2 and is operated with this actuator 1, an operating rod 3 reaching as far as into the valve body 2 is arranged. This operating rod 3 is, as is known, guided by the flange 4 and the lead-through realizes a defined maximum flow of the fluid. In the lead-through of the operating rod 3 through flange 4, in a novel way essentially the effective length L of the annular gap 12 between the operating rod 3 and annular element exceeds the material thickness H of the flange 4 defined as broadly as possible. The advantage of this design comprises the fact that now, by means of a simpler mathematical calculation through the dimensioning of the component parts, the maximum permitted volume flow rate Q of a fluid from the inside of a defective valve body (with torn diaphragm) can be restricted and set in advance precisely in the actuator chamber 6. The tolerances can be controlled without difficulty with mass production technologies, by which the arrangement can be achieved cheaply.

It is of a considerable advantage if the annular element is structurally integrated into actuator 1, for example, is formed with a flanged collar 10 directly moulded on.

In general, it is also possible that the effective annular gap 12 in the actuator 1 for a valve unit is formed between the annular element and the flange 4. This leads to a better and simpler fitting of the component parts to each other. However, the flange 4 is then, for example, to be provided with a flange collar 10 or an additional bushing 8, or the flange is to be designed generally much thicker than before in this area, in order to be able to achieve the required annular gap length.

DETAILED DESCRIPTION OF VARIOUS EMBODIMENTS

Figure 1:
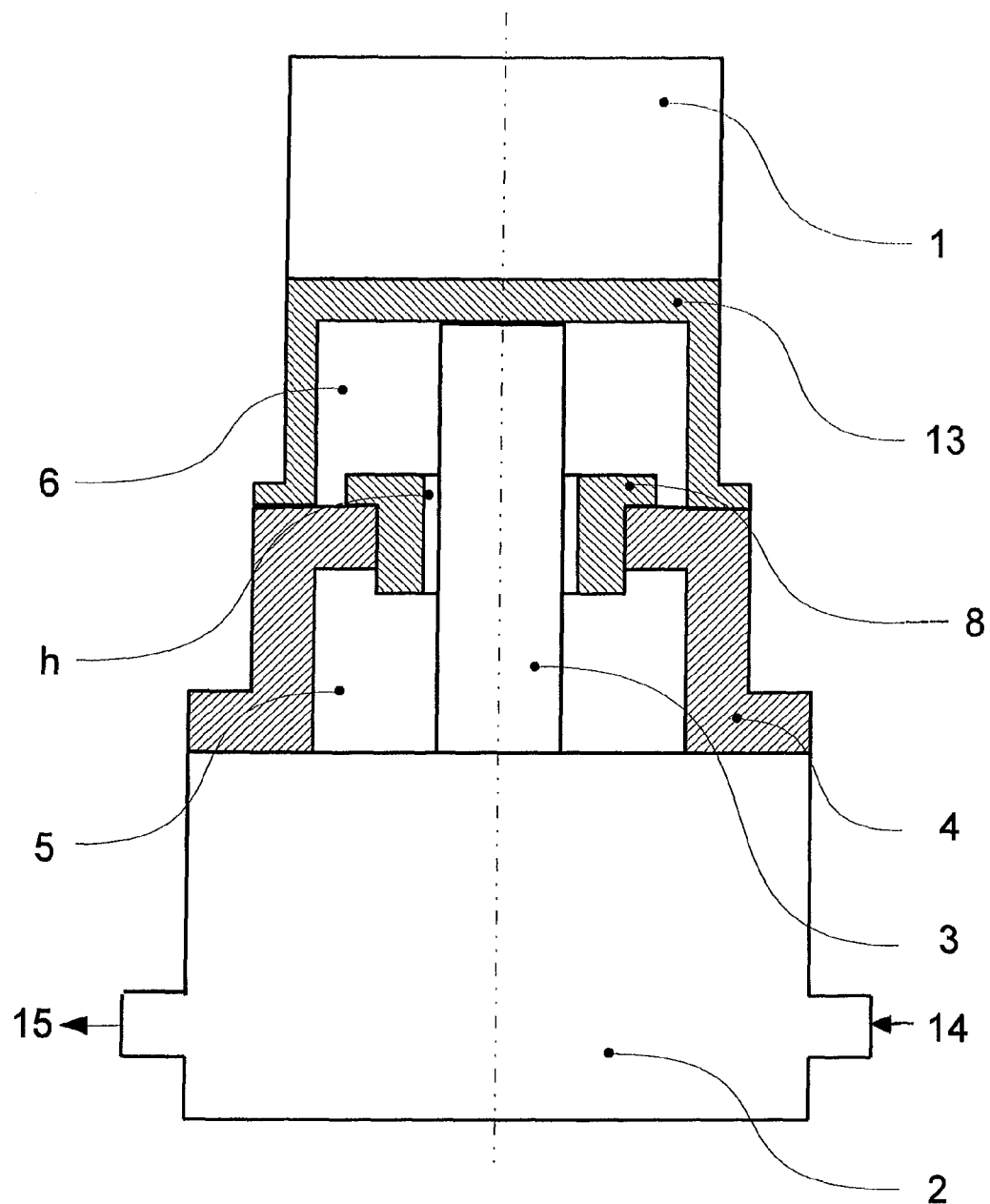
FIG. 1 is a schematic diagram illustrating a valve drive assembly applied on a valve body in accordance with an exemplary embodiment of the present invention, wherein a bushing 8 is installed as an annular element.

Various embodiments of the present invention are described, by way of example only, with reference to the drawings, in which identical or related structures, elements, or parts may be labeled with the same reference numerals throughout the figures. Dimensions of components and features shown in the figures are generally chosen for convenience and clarity of presentation and are not necessarily to scale.

FIG. 1 illustrates a valve drive assembly applied on a valve body 2 in accordance with one embodiment of the present invention. Valve drive assembly includes a flange 4, an operating rod 3 and an annular element. Operating rod 3 is disposed through said flange. Fluid flows into valve body 2 from supply opening 14 and flows out of drain opening 15

A valve flap (not shown) disposed on operating rod 3 is arranged inside the valve body 2 as a means of driving, for example purely rotatory or by means of a linear movement or jointly by means of both types of movement. The flange 4 is supported sealed on the housing of the valve body 2 and is connected to the same in a suitable way. The flange 4 encompasses a flanged chamber 5 with the housing. Normally the inside of the valve body 2 is sealed against the flange chamber 5 by means of a diaphragm, so that no fluid flowing through the valve can exit when the valve flap is open. However, if the diaphragm is not sealed, fluid seeps into the flange chamber 5. Then a certain quantity of fluid leaks along the lead-through of operating rod 3, conditioned by the thickness of annular gap h, into the intermediate chamber 6 open to the outside formed by the flange-type actuator base 13. In this embodiment, annular element (in this embodiment a bushing 8) is disposed between the flange 4 and the operating rod 3 defining an annular gap 12 between annular element and operating rod 3. An effective length L of the annular gap (12) exceeds the material thickness H of the flange 4.

Figure 2:
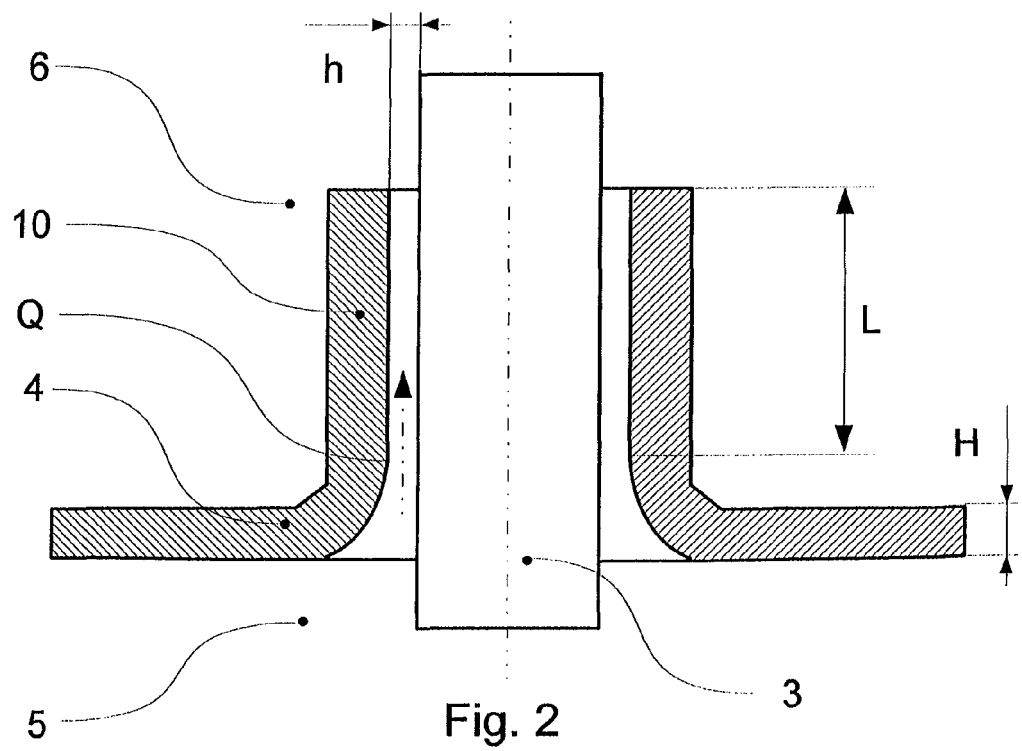
FIG. 2 is a schematic diagram illustrating an alternative valve drive assembly in accordance with an exemplary embodiment of the present invention, wherein a flange collar 10 is installed as an annular element.

FIG. 2 shows a detail of an embodiment with a novel flange collar 10 which serves as annular element with the same material. This design is particularly suitable for the deep-drawing process in mass production.

Figure 3:
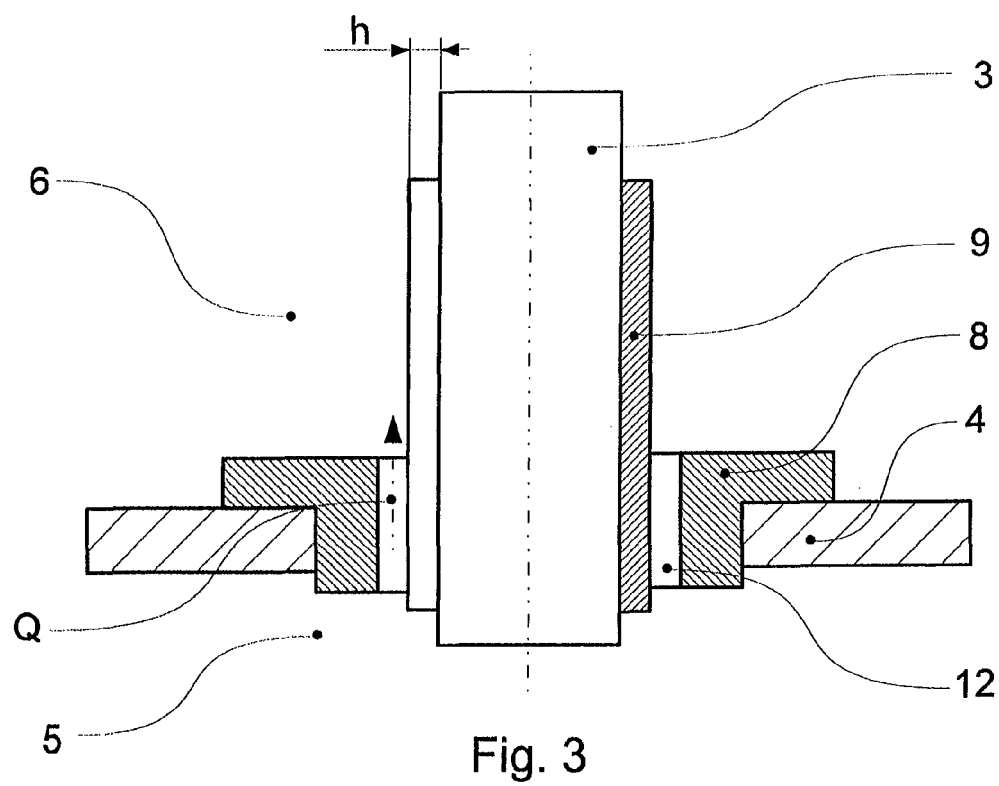
FIG. 3 is a schematic diagram illustrating an alternative valve drive assembly in accordance with an exemplary embodiment of the present invention, wherein a sleeve 9 is disposed between the operating rod and the bushing.

In FIG. 3, a bushing 8 is fitted between flange 4 and operating rod 3 both for guiding and mounting the operating rod 3 and for the defined restriction of flow. The interference fit dimension between the operating rod 3 and bushing 8 is consequently formed considerably greater in contrast to the designs of prior arts, which enables both the production of the bushing 8 by means of simpler and cheaper manufacturing processes suitable for mass production and larger tolerances of the operating rod 3 in production. Therefore, a correspondingly high-precision surface post-treatment of operating rod 3 is not required.

Figure 4:
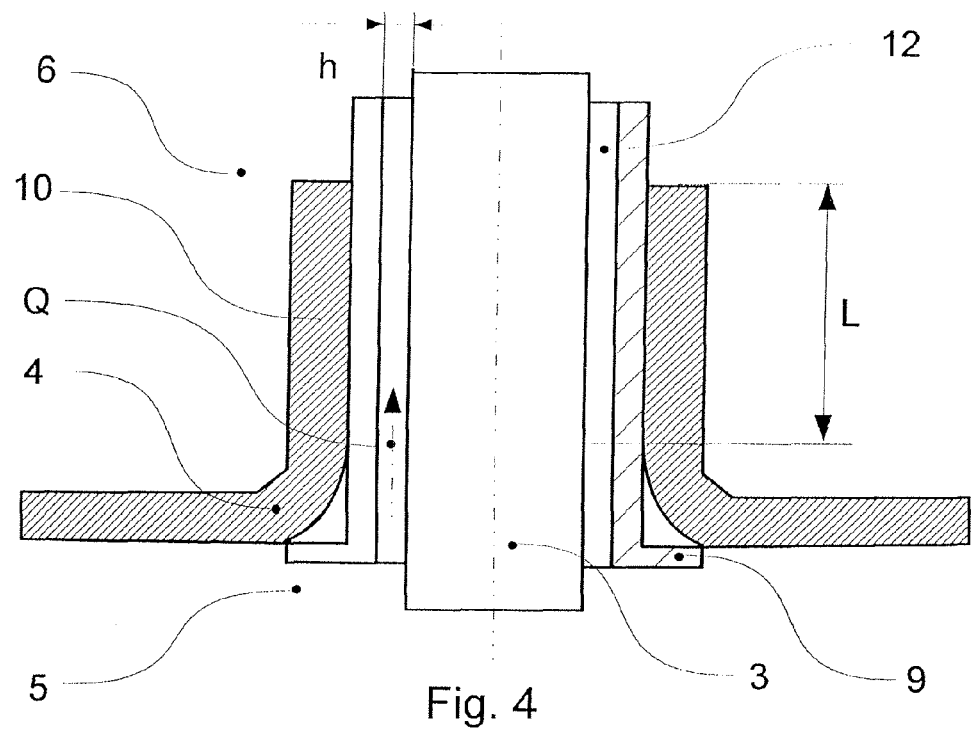
FIG. 4 is a schematic diagram illustrating an alternative valve drive assembly in accordance with an exemplary embodiment of the present invention, wherein a sleeve 9 and flange collar 10 are disposed between a flange and an operating rod.

FIG. 3 and FIG. 4 show another two preferred embodiment. In these cases, a bushing 8 or flange collar 10 is disposed on flange 4, and a sleeve 9 is arranged around operating rod 3. The defined annular gap 12 can be formed, between the bushing 8 and sleeve 9 (shown in FIG. 3), between the flange collar 10 and sleeve 9 (shown in FIG. 4), or between sleeve 9 and operating rod 3 (shown in FIG. 3 and FIG. 4), which further simplifies the fitting. In general, sleeve 9 is movably arranged both opposite the bushing 8 or the flange collar 10 along the operating rod 3. Due to this additionally used sleeve 9, which can be designed to any length, as annular element, an optimum adjustment of the volume flow rate is possible. Sleeve 9 can not be pushed out with great pressure in flange chamber 5, this is designed either so long that the sleeve 9 rests on actuator 1, or it is provided on the inside with a protruding annular attachment, or if only the sleeve 9 is mounted only on the inside or only on the outside, this is designed to be rigidly connected to a component part.

A similar technical solution is illustrated in FIG. 4. In this case, the novel sleeve 9 together with a simply illustratable flange collar 10 is show in the same action as already described previously. With both of these designs, however, the effective annular gap 12 can also be formed further inside (as illustrated here), in other words, between operating rod 3 and sleeve 9.

Figure 5:
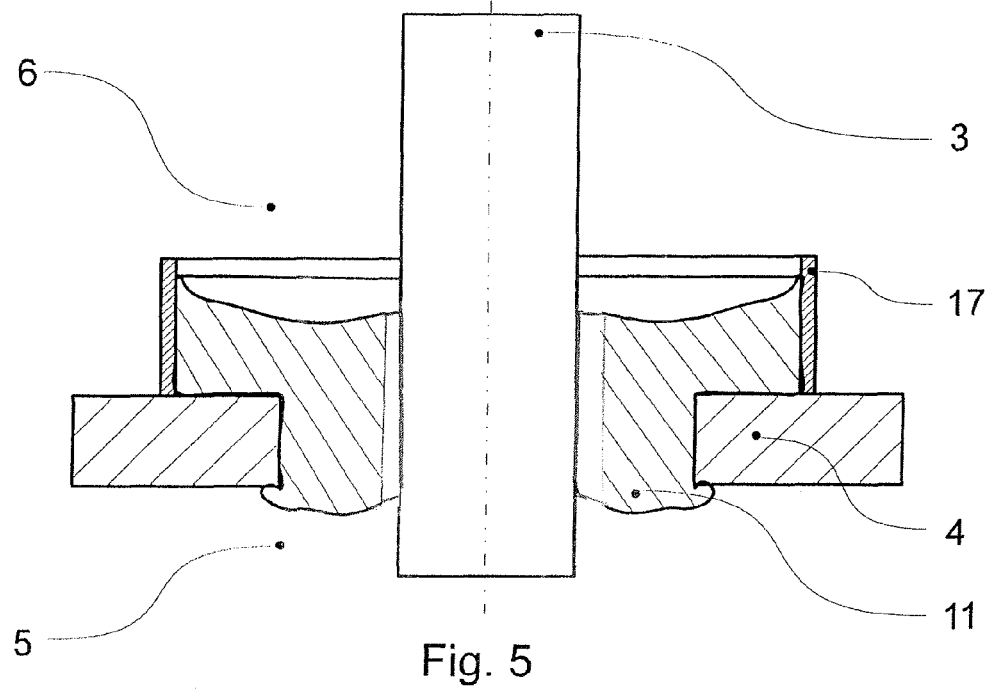
FIG. 5 is a schematic diagram illustrating an alternative sealing compound as valve drive assembly in accordance with an exemplary embodiment of the present invention.

FIG. 5 illustrates an embodiment where an annular element, in this embodiment a suitable sealing compound 11, is introduced and arranged. Depending on the viscosity of the sealing compound used, it may be necessary to use a further additional annular auxiliary component 17. Preferred are sealing compounds 11 which swell after curing management, by which the flange gap is reliably filled, annular element also encompasses the flange inside, thus liquid sliding out towards the actuator drive is reliably excluded.

Figure 6:
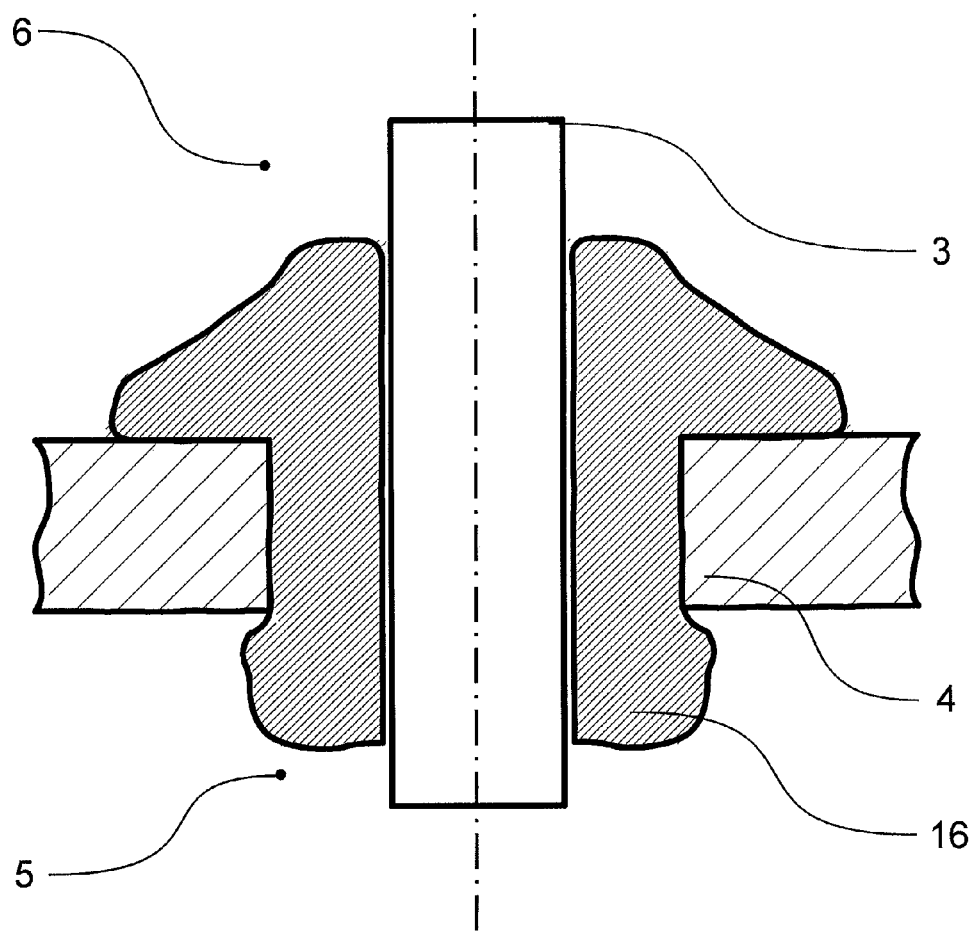
FIG. 6 is a schematic diagram illustrating an alternative blocking obstacle as valve drive assembly in accordance with an exemplary embodiment of the present invention.

FIG. 6 shows a further alternative embodiment, where instead of a sealing compound 11, an additional, suitable blocking obstacle 16 made of welding material (for example a suitable soldering or brazing material) is introduced as annular element. The action is the same as for the sealing compound described previously. It is not substantial which movement the operating rod 3 effects here. In this case, it can effect a rotatory or translatory movement.

This previously described technical solution can be used primarily for lead-throughs of actuator-operated operating rods for valve units for regulating the most varied of fluid flows.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. A valve drive assembly with an integrated fluid flow adjusting lead-through in a flange, comprising:
   the flange having a thickness;
   an operating rod disposed through said flange, a space between the operating rod and flange defining a leak rate; and
   at least one of an additional annular element, additional structural detail and additional material installed between said flange and said operating rod;
   said at least one of additional annular element, additional structural detail and additional material and said operating rod define an annular gap there between, being continuous along an effective length parallel to an axis of the operating rod and larger than the thickness of said flange so as to define a volume through which a fluid flow rate is set less than the leak rate.

2. The valve drive assembly of claim 1, wherein said annular element includes a bushing.

3. The valve drive assembly of claim 2, further comprising a sleeve disposed between said operating rod and said bushing, wherein the annular gap is formed either between said operating rod and said sleeve or between said sleeve and said bushing.

4. The valve drive assembly of claim 1, wherein said additional structural detail includes a flange collar.

5. The valve drive assembly of claim 4, further comprising a sleeve disposed between said operating rod and said flange collar, wherein the annular gap is formed either between said operating rod and said sleeve, or between said sleeve and said flange collar.

6. The valve drive assembly of claim 1, wherein the additional material includes a sealing compound.

7. The valve drive assembly of claim 6, wherein the additional material further includes an annular auxiliary component to seal said sealing compound.

8. The valve drive assembly of claim 1, wherein said annular element includes a blocking obstacle made of welding material.

9. The valve drive assembly of claim 8, wherein said blocking obstacle includes solder or brazing material.

10. A valve, comprising:
    a valve body;
    an actuator disposed over said valve body;
    a valve drive assembly with an integrated fluid flow adjusting lead-through in a flange, including:
    the flange having a thickness disposed between said valve body and said actuator;
    an operating rod driven by said actuator and disposed through said flange, a space between the operating rod and flange defining a leak rate;
    at least one of an additional annular element, additional structural detail and additional material installed between said flange and said operating; and
    said at least one of annular element, additional structural detail and additional material and said operating rod define an annular gap there between, being continuous along an effective length parallel to an axis of the operating rod and larger than the thickness of said flange so as to define a volume through which a fluid flow rate is set less than the leak rate.

11. The valve of claim 10, wherein the actuator further includes an actuator base disposed on the flange and said actuator is installed on the actuator base.

* * * * *